United States Patent
Hasegawa

(10) Patent No.: US 9,374,249 B2
(45) Date of Patent: Jun. 21, 2016

(54) RECEIVING APPARATUS AND EQUALIZATION PROCESSING METHOD

(71) Applicant: FUJITSU LIMITED, Kawasaki-shi, Kanagawa (JP)

(72) Inventor: Tsuyoshi Hasegawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/849,973

(22) Filed: Sep. 10, 2015

(65) Prior Publication Data

US 2016/0105294 A1    Apr. 14, 2016

(30) Foreign Application Priority Data

Oct. 10, 2014  (JP) .................................. 2014-209495

(51) Int. Cl.
  *H04L 27/06*   (2006.01)
  *H04L 25/02*   (2006.01)
  *H04L 25/03*   (2006.01)

(52) U.S. Cl.
  CPC ...... *H04L 25/0242* (2013.01); *H04L 25/03006* (2013.01); *H04L 25/03878* (2013.01)

(58) Field of Classification Search
  CPC .............. H04L 1/0054; H04L 27/2647; H04B 7/8054; H03M 13/41; H03M 13/4107
  USPC .......... 375/341, 260, 267, 346; 370/342, 335; 455/213; 714/795
  See application file for complete search history.

(56) References Cited

U.S. PATENT DOCUMENTS

| 8,295,383 B2 * | 10/2012 | Yoshida | H04B 1/71052 375/267 |
| 8,300,677 B2 * | 10/2012 | Hua | H04L 25/0242 375/148 |
| 2015/0295670 A1 * | 10/2015 | Seyama | H04J 11/005 370/329 |

OTHER PUBLICATIONS

Dirk Wübben et al, MMSE Extension of V-BLAST based on Sorted QR Decomposition, IEEE 2003 (5 pages).
Noriyuki Maeda et al, "QRM-MLD Combined with MMSE-Based Multipath Interference Canceller for MIMO Multiplexing in Broadband DS-CDMA", pp. 1741-1746, IEEE 2004 (6 pages).

* cited by examiner

*Primary Examiner* — Khai Tran
(74) *Attorney, Agent, or Firm* — Fujitsu Patent Center

(57) ABSTRACT

A communication processor of a receiving apparatus includes a channel matrix calculation unit, a noise power calculation unit, and an interference orthogonalization equalizer. The channel matrix calculation unit calculates a channel matrix of a propagation path based on a reception signal. The noise power calculation unit calculates noise power included in the reception signal. The interference orthogonalization equalizer orthogonalizes an interference signal by equalizing the reception signal by using the channel matrix and the noise power.

10 Claims, 10 Drawing Sheets

ND EQUALIZATION PROCESSING METHOD

RECEIVING APPARATUS AND EQUALIZATION PROCESSING METHOD

CROSS-REFERENCE TO RELATED APPLICATION

This application is based upon and claims the benefit of priority of the prior Japanese Patent Application No. 2014-209495, filed on Oct. 10, 2014, the entire contents of which are incorporated herein by reference.

FIELD

The embodiments discussed herein are related to a receiving apparatus and an equalization processing method.

BACKGROUND

In a radio system that uses orthogonal frequency division multiplexing (OFDM) modulation to perform multiple-input and multiple-output (MIMO) transmission, a desired reception characteristic can be obtained by using maximum likelihood detection (MLD) demodulation. This results from a small amount of interference from an adjacent symbol in each of sub-carriers in OFDM. In a radio system, such as code division multiple access (CDMA), where an influence of multipath interference is large, however, a wide range of window to be influenced by the multipath is assumed; thus, MLD is performed for all patterns of many adjacent symbols. Accordingly, the processing volume is increased exponentially.

To solve this problem, a method has been proposed for removing multipath interference, before performing MLD processing, by using a multipath interference canceller based on minimum mean square error (MMSE)

Non-Patent Document 1: Dirk Wubben et al, "MMSE Extension of V-BLAST based on Sorted QR Decomposition", IEEE 2003. Non-Patent Document 2: Noriyuki Maeda et al, "QRM-MLD Combined with MMSE-Based Multipath Interference Canceller for MIMO Multiplexing in Broadband DS-CDMA", IEEE 2004.

Since the computation volume of the multipath interference canceller alone is high, however, the computation volume for an entire apparatus is still high. Therefore, power consumption for computation processing is large, making it difficult for the apparatus to be implemented on a portable terminal which permits limited power consumption. Furthermore, a plurality of high-performance processors are provided in some cases for achieving high-speed computation, making it difficult for the apparatus to be mounted on a portable terminal with limited packaging area.

SUMMARY

According to an aspect of an embodiment, a receiving apparatus includes a channel matrix calculation unit, a noise power calculation unit, and an interference orthogonalization equalizer. The channel matrix calculation unit calculates a channel matrix of a propagation path based on a reception signal. The noise power calculation unit calculates a noise power included in the reception signal. The interference orthogonalization equalizer orthogonalizes an interference signal by equalizing the reception signal by using the channel matrix and the noise power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The following embodiments are not intended to limit the techniques disclosed. The embodiments can be appropriately combined within such a range that processing operations do not conflict with each other.

[a] First Embodiment

Receiving Apparatus 10

Figure 1:
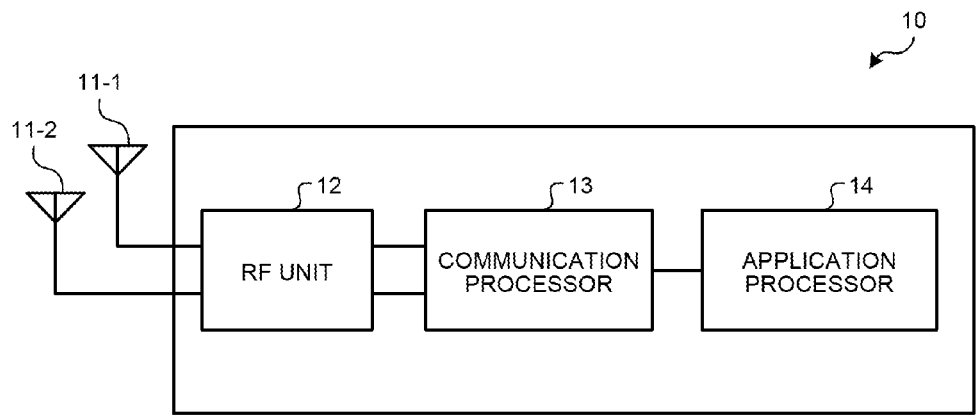
FIG. 1 is a block diagram illustrating an exemplary receiving apparatus according to a first embodiment.

FIG. 1 is a block diagram illustrating an exemplary receiving apparatus 10 according to a first embodiment. The receiving apparatus 10 according to the present embodiment includes a plurality of antennas 11-1 and 11-2, a radio frequency (RF) unit 12, a communication processor 13, and an application processor 14.

The RF unit 12 down-converts a radio signal received from a transmitting apparatus (base station, for example) via each of the antennas 11-1 and 11-2, from a carrier frequency signal to a baseband signal having a baseband frequency. The RF unit 12, then, performs orthogonal demodulation and analog to digital (A/D) conversion on the baseband signal and transmits the digital signal to the communication processor 13.

The RF unit 12 also performs digital to analog (D/A) conversion on the digital signal received from the communication processor 13, and then, performs orthogonal modulation on the signal. The RF unit 12 subsequently up-converts the orthogonally-modulated signal from the baseband frequency signal to the carrier frequency signal, then, transmits the signal from each of the antennas 11-1 and 11-2 with predetermined power.

The communication processor 13 performs processing such as demodulation, decoding, and error correction on the baseband signal received from the RF unit 12, and then, outputs the signal to the application processor 14. Furthermore, the communication processor 13 encodes the data received from the application processor 14, performs digital modulation on the encoded data, and outputs the digitally modulated signal to the RF unit 12.

In the present embodiment, the communication processor 13 is implemented with one central processing unit (CPU), for example. In another embodiment, however, the communication processor 13 may be implemented with combining two or more CPUs, a digital signal processor (DSP), or the like. Furthermore, the RF unit 12, the communication processor 13, and the application processor 14 each may be provided as a separate chip within the receiving apparatus 10, or may be integrated to be provided on one chip within the receiving apparatus 10 by using a system-on-a-chip (SoC) technique, or the like. In the present embodiment, description follows by giving, as an example, a 2×2 MIMO system that uses two antennas for each of the transmission and reception sides. Note that the number of antennas to be used for each of the transmission and the reception sides may be two or more.

Communication Processor 13

Figure 2:
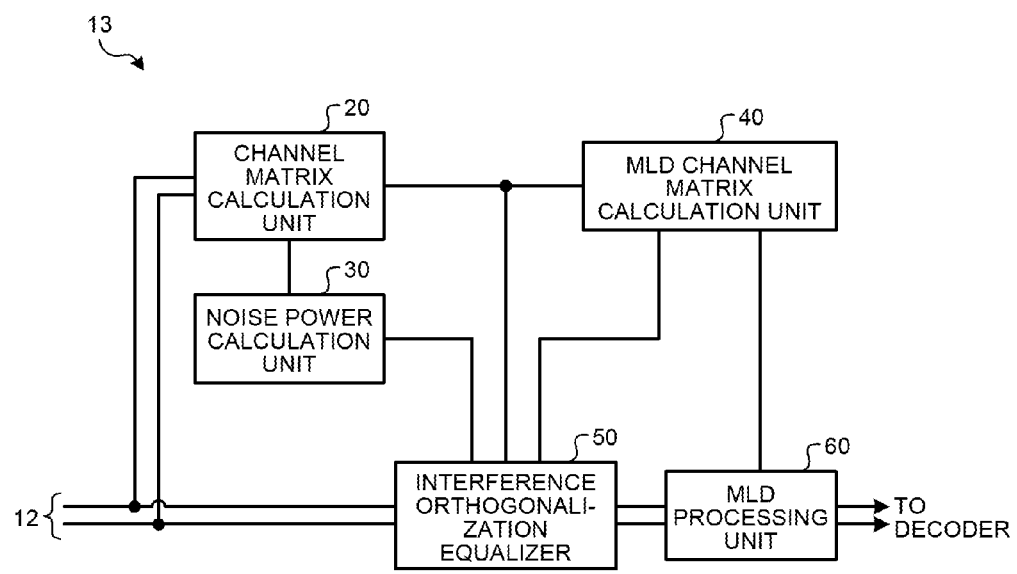
FIG. 2 is a block diagram illustrating an exemplary communication processor according to the first embodiment.

FIG. 2 is a block diagram illustrating an exemplary communication processor 13 according to the first embodiment. The communication processor 13 according to the present embodiment includes a channel matrix calculation unit 20, a noise power calculation unit 30, an MLD channel matrix calculation unit 40, an interference orthogonalization equalizer 50, and an MLD processing unit 60.

The channel matrix calculation unit 20 calculates a channel estimation value for a radio propagation path based on a single-carrier MIMO signal received via each of the antennas 11-1 and 11-2. The channel matrix calculation unit 20 then calculates a channel matrix H based on the calculated channel estimation value. The noise power calculation unit 30 calculates noise power $\sigma^2$ by using the channel matrix H calculated by the channel matrix calculation unit 20.

Using the channel matrix H calculated by the channel matrix calculation unit 20 and the noise signal $\sigma^2$ calculated by the noise power calculation unit 30, the interference orthogonalization equalizer 50 generates a weight $W_o$ for orthogonalizing an interference signal other than a desired signal and a noise signal. The interference orthogonalization equalizer 50, then, equalizes the reception signal by using the generated weight $W_o$. In equalization performed on the interference orthogonalization equalizer 50, the interference signal between antennas related to the desired signal is left as it is although the interference signal and the noise signal have been orthogonalized. In this respect, the equalization differs from ordinary equalization.

Using the channel matrix H calculated by the channel matrix calculation unit 20 and the noise power $\sigma^2$ calculated by the noise power calculation unit 30, the MLD channel matrix calculation unit 40 calculates an MLD channel matrix $H_{MLD}$ including a characteristic of the interference orthogonalization equalizer 50. Using the MLD channel matrix $H_{MLD}$ calculated by the MLD channel matrix calculation unit 40, the MLD processing unit 60 performs MLD processing for the reception signal in which the interference signal and the noise signal have been orthogonalized by the interference orthogonalization equalizer 50.

If MLD is directly performed on the signal equalized by an MMSE equalizer, which is a widely used equalizer, a reception characteristic such as BER is not so good. One of the reasons is considered to be a correlation in the interference signal and the noise signal that have been left after equalization is performed using the MMSE equalizer. Since MLD assumes Gaussian noise that has no correlation, the assumption is canceled in case of a correlated interference signal and a noise signal, leading to a deteriorated reception characteristic.

Accordingly, in the present embodiment, a weight for the equalizer is calculated such that it may decorrelate the interference signal and the noise signal after equalization is performed. Using the calculated weight, the reception signal is equalized. This improves a reception characteristic in MLD. Furthermore, since influence of multipath is removed from the reception signal by using the interference orthogonalization equalizer 50, the MLD processing volume is decreased.

Figure 3:
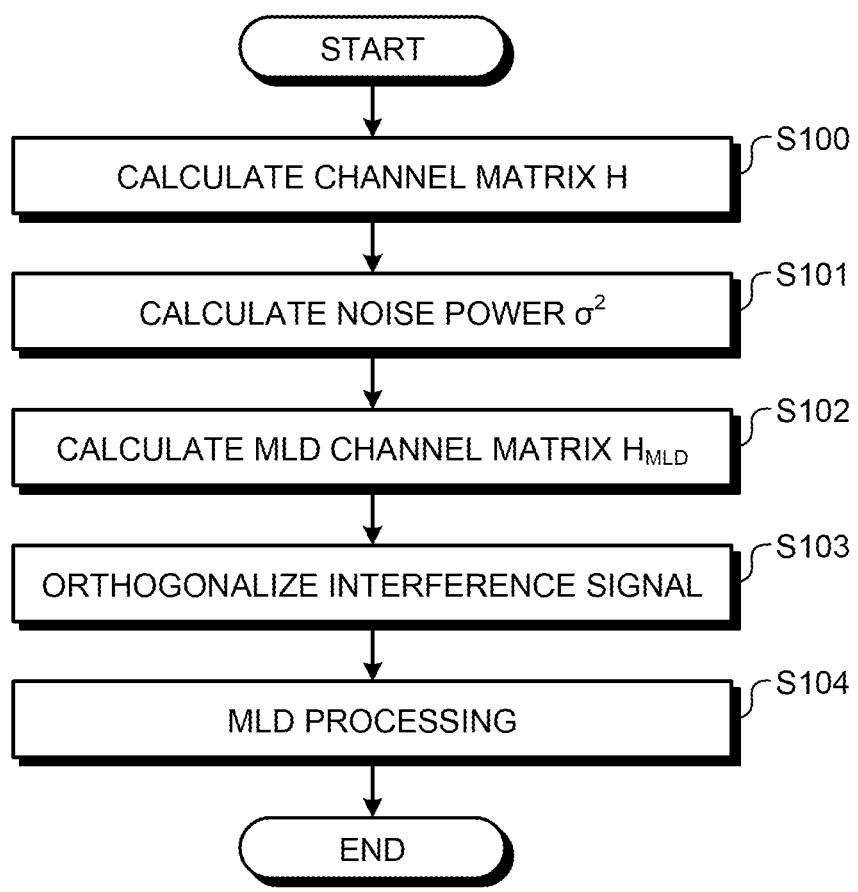
FIG. 3 is a flowchart illustrating an exemplary demodulation processing.

FIG. 3 is a flowchart illustrating an exemplary demodulation processing.

First, the channel matrix calculation unit 20 calculates a channel estimation value for a radio propagation path based on a plurality of reception signal sequences received via each of the antennas 11-1 and 11-2. The channel matrix calculation unit 20, then, calculates a channel matrix H based on the calculated channel estimation value (S100).

Next, the noise power calculation unit 30 calculates noise power $\sigma^2$ by using the channel matrix H calculated by the channel matrix calculation unit 20 (S101). Using the channel matrix H calculated by the channel matrix calculation unit 20 and the noise power $\sigma^2$ calculated by the noise power calculation unit 30, the MLD channel matrix calculation unit 40 calculates the MLD channel matrix $H_{MLD}$ (S102).

Using the channel matrix H calculated by the channel matrix calculation unit 20 and the noise power $\sigma^2$ calculated by the noise power calculation unit 30, the interference orthogonalization equalizer 50 generates a weight $W_o$ for orthogonalizing the interference signal other than a desired signal and the noise power. Then, the interference orthogonalization equalizer 50 equalizes the reception signal by using the generated weight $W_o$ (S103). Using the MLD channel matrix $H_{MLD}$ calculated by the MLD channel matrix calculation unit 40, the MLD processing unit 60 performs MLD processing for the reception signal in which the interference signal has been orthogonalized by the interference orthogonalization equalizer 50 (S104).

Effects of First Embodiment

Using the communication processor 13 of the present embodiment, the computation volume for demodulation processing can be reduced while maintaining the reception characteristic.

[b] Second Embodiment

The present embodiment describes exemplary specific processing performed by the MLD channel matrix calculation unit 40 and the interference orthogonalization equalizer 50. A transmission signal vector in which a series of transmission signals $x_i$ is arranged in a time-sequential manner is expressed as $x=(x_1, x_2, \ldots, x_n)^T$ (T represents a transpose symbol). Also, a reception signal vector in which a series of reception signals having a certain reception window width is arranged in a time-sequential manner, is expressed as $y=(y_1, y_2, \ldots, y_n)^T$. The reception signal vector y can be expressed, by using a channel matrix H and a reception noise vector z, as in equation (1) below.

$$y = Hx + z \qquad (1)$$

Next, it is assumed to be a case of restoring the transmission signal $x_i$ by using a signal $w^H y$, which has been combined by multiplying the reception signal vector y by an appropriate weight vector w ($w^H$ represents a Hermitian transpose of w).

Here, the weight that minimizes a mean squared error with the transmission signal $x_i$ is known as an MMSE weight, which can be obtained by the following equations.

$$Rw = h_{a_1} \quad (2)$$

$$R = HH^H \sigma^2 I \quad (3)$$

$$w = R^{-1} h_{a_1} \quad (4)$$

Here, R represents a correlation matrix, I representing an identity matrix. Furthermore, $h_{a_1}$ represents a column vector that corresponds to a desirable timing $a_1$ to demodulate when the channel matrix H is expressed by using a column vector $h_i$ as $H=(h_1, h_2, \ldots, h_n)$. With representation of the channel matrix H, the correlation matrix R can also be expressed as follows.

$$R = \sum_i h_i h_i^H + \sigma^2 I \quad (5)$$

Next, when a 2×2 MIMO system is assumed, the reception signal vector y is expressed separately for a signal with a desired timing $a_x$ and the other signals. In the 2×2 MIMO system, in which two signals are simultaneously transmitted, there are two desired signals to demodulate. Now the number of signals are defines as $a_1$ and $a_2$. Definition of $s_1, s_2, H_1$, and $H_2$ are as follows.

$$s_1 = (x_{a_1}, x_{a_2})^T \quad (6)$$

$$s_2 = (x_1, x_2, \ldots)^T \text{ (vector in which items other than } x_{a_1}, x_{a_2} \text{ are arranged)} \quad (7)$$

$$H_1 = (h_{a_1}, h_{a_2}) \quad (8)$$

$$H_2 = (h_1, h_2, h_3, \ldots) \text{ (matrix in which items other than } h_{a_1}, h_{a_2} \text{ are arranged)} \quad (9)$$

The reception signal vector y can be expressed as follows.

$$y = H_1 s_1 + (H_2 s_2 + z) \quad (10)$$

In above-described equation (10), $H_1 s_1$ represents the desired signal. The section in parentheses, which is a latter part of equation (10), represents the interference signal and the noise signal. Using the following equation (11), a correlation matrix M between the interference signal and the noise signal is calculated. Furthermore, Cholesky decomposition is performed for the correlation matrix M to calculate a lower triangular matrix L.

$$M = \langle (H_2 s_2 + z)(H_2 s_2 + z)^H \rangle = H_2 H_2^H + \sigma^2 I = LL^H \quad (11)$$

At the last equal sign in above-described equation (11), Cholesky decomposition is performed. As illustrated in the following equation (12), the interference signal and the noise signal can be orthogonalized by multiplying a reception signal vector by $L^{-1}$, which is an inverse matrix of the lower triangular matrix L.

$$L^{-1} y = L^{-1} H_1 s_1 + L^{-1} (H_2 s_2 + z) \quad (12)$$

Note that two signals being orthogonalized means the correlation matrix of the two signals becomes an identity matrix. For example, correlating an interference term (second term on the right-hand side) of equation (12) results in an identity matrix as illustrated in the following equation (13).

$$\langle (L^{-1}(H_2 s_2 + z))(L^{-1}(H_2 s_2 + z))^H \rangle = L^{-1} \langle (H_2 s_2 + z)(H_2 s_2 + z)^H \rangle L^{-H} = L^{-1} LL^H L^{-H} = I \quad (13)$$

Here, $L^{-H}$ represents either $(L^{-1})^H$ or $(L^H)^{-1}$. Next in above-described equation (12), the term of the desired signal $L^{-1} H_1 s_1$ (first term on the right-hand side) has a plurality of rows (n rows). In order to rearrange this, QR decomposition is performed for a coefficient matrix $L^{-1} H_1$.

$$L^{-1} H_1 = Q_1 R_1 \quad (14)$$

Here, $R_1$ represents a 2×2 upper triangular matrix. $Q_1$ represents an n×2 matrix that meets the following equation.

$$Q_1^H Q_1 = I \quad (15)$$

By multiplying the both sides of the above-described equation (12) by $Q_1^H$, a signal component can be rearranged into two variables, for example, as illustrated in the following equation (16).

$$Q_1^H L^{-1} y = Q_1^H L^{-1} H_1 s_1 + Q_1^H L^{-1} (H_2 s_2 + z) = R_1 s_1 + Q_1^H L^{-1} (H_2 s_2 + z) \quad (16)$$

At the last equal sign in above-described equation (16), previously described equations (14) and (15) are used. Note that according to a property of equation (15), an interference term which $Q_1^H$ has multiplied maintains orthogonality (the correlation matrix becomes an identity matrix). An interference orthogonalization equalizer weight $W_o$ can be obtained from a Hermitian transpose of the coefficient of the reception signal vector y in above-described equation (16). Furthermore, a 2×2 MLD channel matrix $H_{MLD}$ which has been used at a later stage MLD processing can be obtained from a coefficient of $s_1$ in equation (16).

$$Wo = L^{-H} Q_1 \quad (17)$$

$$H_{MLD} = R_1 \quad (18)$$

Communication Processor 13

Figure 4:
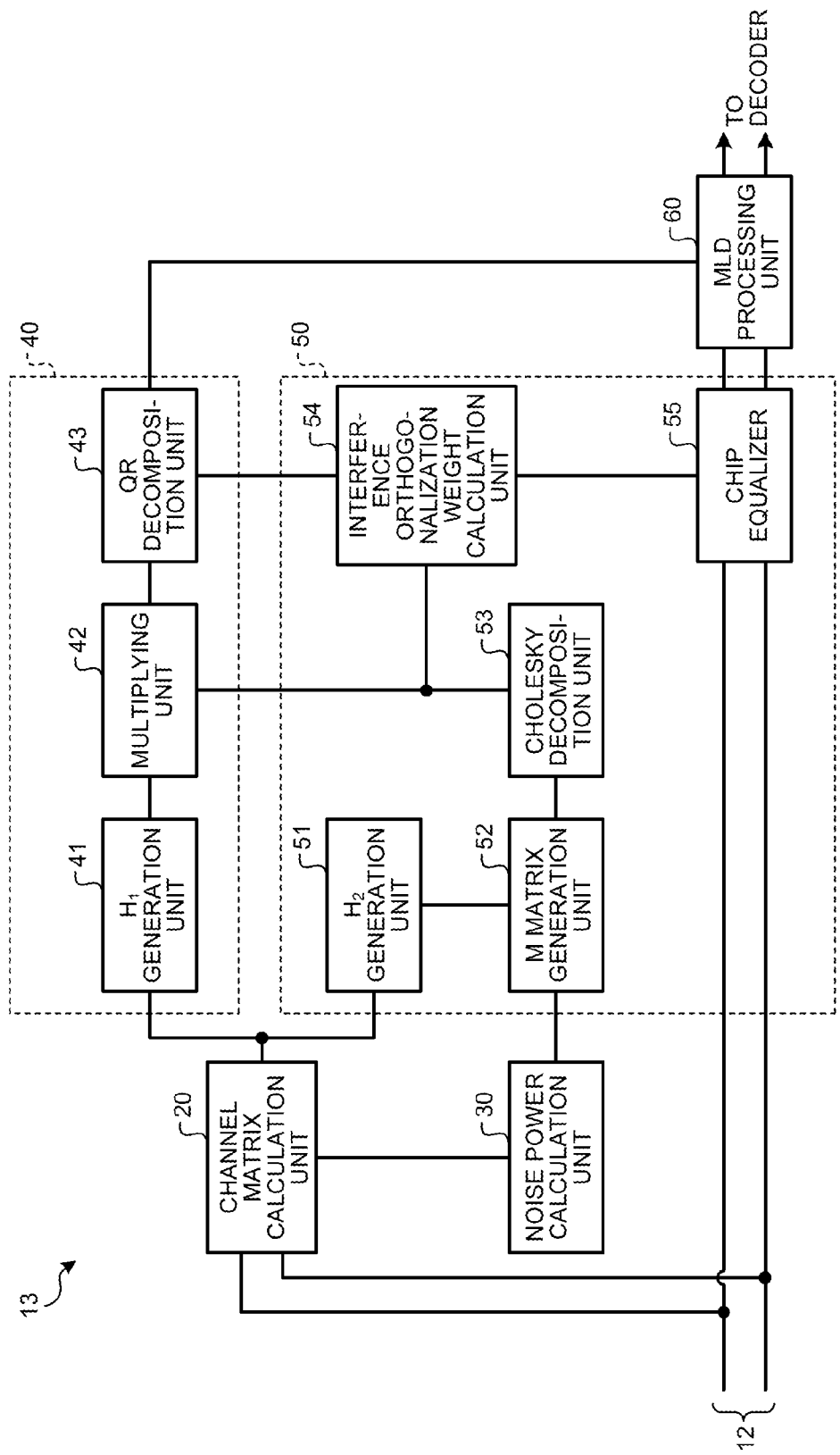
FIG. 4 is a block diagram illustrating an exemplary communication processor according to a second embodiment.

FIG. 4 is a block diagram illustrating an exemplary communication processor 13 according to the second embodiment. The communication processor 13 according to the present embodiment includes the channel matrix calculation unit 20, the noise power calculation unit 30, the MLD channel matrix calculation unit 40, the interference orthogonalization equalizer 50, and the MLD processing unit 60. Other than the following to be explained, the configuration in FIG. 4 having the same signs as in FIG. 2 has the same or similar function as in FIG. 2. Therefore, explanation for this will be omitted.

The MLD channel matrix calculation unit 40 has an $H_1$ generation unit 41, a multiplying unit 42, and a QR decomposition unit 43. The $H_1$ generation unit 41 generates an $H_1$ matrix configured with a column vector that is included in the channel matrix H and corresponds to desired signal timings $a_1$ and $a_2$ as illustrated in previously described (8). The multiplying unit 42 multiplies the $H_1$ matrix generated by the $H_1$ generation unit 41 and the inverse matrix $L^{-1}$ of the lower triangular matrix L calculated by a Cholesky decomposition unit 53 to be described later.

The QR decomposition unit 43 performs QR decomposition for $L^{-1} H_1$ which is the product of the $H_1$ matrix and the inverse matrix $L^{-1}$ multiplied by the multiplying unit 42. The QR decomposition unit 43, then, outputs the upper triangular matrix $R_1$ obtained by QR decomposition to the MLD processing unit 60, and outputs an orthogonal matrix $Q_1$ to an interference orthogonalization weight calculation unit 54 to be described later.

The interference orthogonalization equalizer 50 includes an $H_2$ generation unit 51, an M matrix generation unit 52, the Cholesky decomposition unit 53, the interference orthogonalization weight calculation unit 54, and a chip equalizer 55. The $H_2$ generation unit 51 generates an $H_2$ matrix configured with a column vector that is included in the channel matrix H and corresponds to timings other than desired signal timings as illustrated in previously described (9).

The M matrix generation unit 52 calculates a correlation matrix M by using the $H_2$ matrix generated by the $H_2$ generation unit 51 and the noise power $\sigma^2$ calculated by the noise power calculation unit 30 based on previously described equation (11). The Cholesky decomposition unit 53 performs Cholesky decomposition for the correlation matrix M calculated by the M matrix generation unit 52, as illustrated in previously described equation (11) to calculate the lower triangular matrix L and a Hermitian transpose $L^H$ of the lower triangular matrix L.

The interference orthogonalization weight calculation unit 54, as illustrated in previously described equation (17), calculates an interference orthogonalization weight $W_o$ by multiplying an inverse matrix $L^{-H}$ of the Hermitian transpose $L^H$ of the lower triangular matrix L, which has been calculated by the Cholesky decomposition unit 53, and the orthogonal matrix $Q_1$ decomposed by the QR decomposition unit 43. The chip equalizer 55 equalizes the reception signal sequence by using the interference orthogonalization weight $W_o$ calculated by the interference orthogonalization weight calculation unit 54.

The MLD processing unit 60 performs MLD processing for the reception signal sequence equalized by the chip equalizer 55 by using the upper triangular matrix $R_1$ decomposed by the QR decomposition unit 43 as the MLD channel matrix $H_{MLD}$.

Effects of Second Embodiment

According to the communication processor 13 of the present embodiment, using the chip equalizer 55 to eliminate multipath influence from the reception signal can suppress the MLD processing volume. According to the communication processor 13 of the present embodiment, decorrelating the interference signal and the noise signal contained in the output of the chip equalizer 55 enables MLD to function efficiently.

[c] Third Embodiment

QR decomposition, when applied to a frequency-domain equalizer, or the like, is not easily treated as an equation. Therefore, in the present embodiment, the MLD channel matrix $H_{MLD}$ is calculated by Cholesky decomposition, not by QR decomposition. In this respect, the present embodiment differs from the second embodiment. Accordingly, it is possible to use a frequency-domain equalizer, or the like.

The interference orthogonalization equalizer weight $W_o$ illustrated in previously described (17) can be modified as follows by using previously described equation (14).

$$Wo = L^{-H}Q_1 = L^{-H}L^{-1}H_1R_1^{-1} = M^{-1}H_1R_1^{-1} \quad (19)$$

Above-described equation (19) can be interpreted as multiplying the correction matrix after equalization is performed using $M^{-1}H_1$. Here, more direct assumption will be: orthogonalizing the interference signal and the noise signal after equalization is performed using $M^{-1}H_1$. Multiplying equation (10) related to the reception signal vector y by $(M^{-1}H_1)^H$ results in the following equation.

$$(M^{-1}H_1)^H y = (M^{-1}H_1)^H H_1 s_1 + (M^{-1}H_1)^H (H_2 s_2 + z) \quad (20)$$

In equation (20), the last term represents the interference signal and the noise signal. These can be modified to be a relatively simple equation as below.

$$\langle ((M^{-1}H_1)^H(H_2s_2+z))((M^{-1}H_1)^H(H_2s_2+z))^H \rangle = H_1^H M^{-1} H_1 \quad (21)$$

Cholesky decomposition for orthogonalization is performed as follows.

$$H_1^H M^{-1} H_1 = LL^H \quad (22)$$

The inverse matrix of the lower triangular matrix L obtained from equation (22) is expressed as $L^{-1}$. A calculation result by multiplying previously described equation (20) by this $L^{-1}$ can be rearranged as follows.

$$L^{-1}(M^{-1}H_1)^H y = L^{-1}(M^{-1}H_1)^H H_1 s_1 + L^{-1}(M^{-1}H_1)^H (H_2 s_2+z) \quad (23)$$

$$(M^{-1}H_1 L^{-H})^H y = L^H s_1 + L^{-1}(M^{-1}H_1)^H (H_2 s_2+z) \quad (24)$$

In equation (24), by computing a Hermitian transpose of the coefficient of the reception signal vector y, the interference orthogonalization equalizer weight $W_o$ can be obtained. Furthermore, in above-described equation (24), from the coefficient of $s_1$, the 2×2 channel matrix $H_{MLD}$, which is to be used at a later stage in MLD processing, can be obtained.

$$Wo = M^{-1}H_1 L^{-H} \quad (25)$$

$$H_{MLD} = L^H \quad (26)$$

Communication Processor 13

Figure 5:
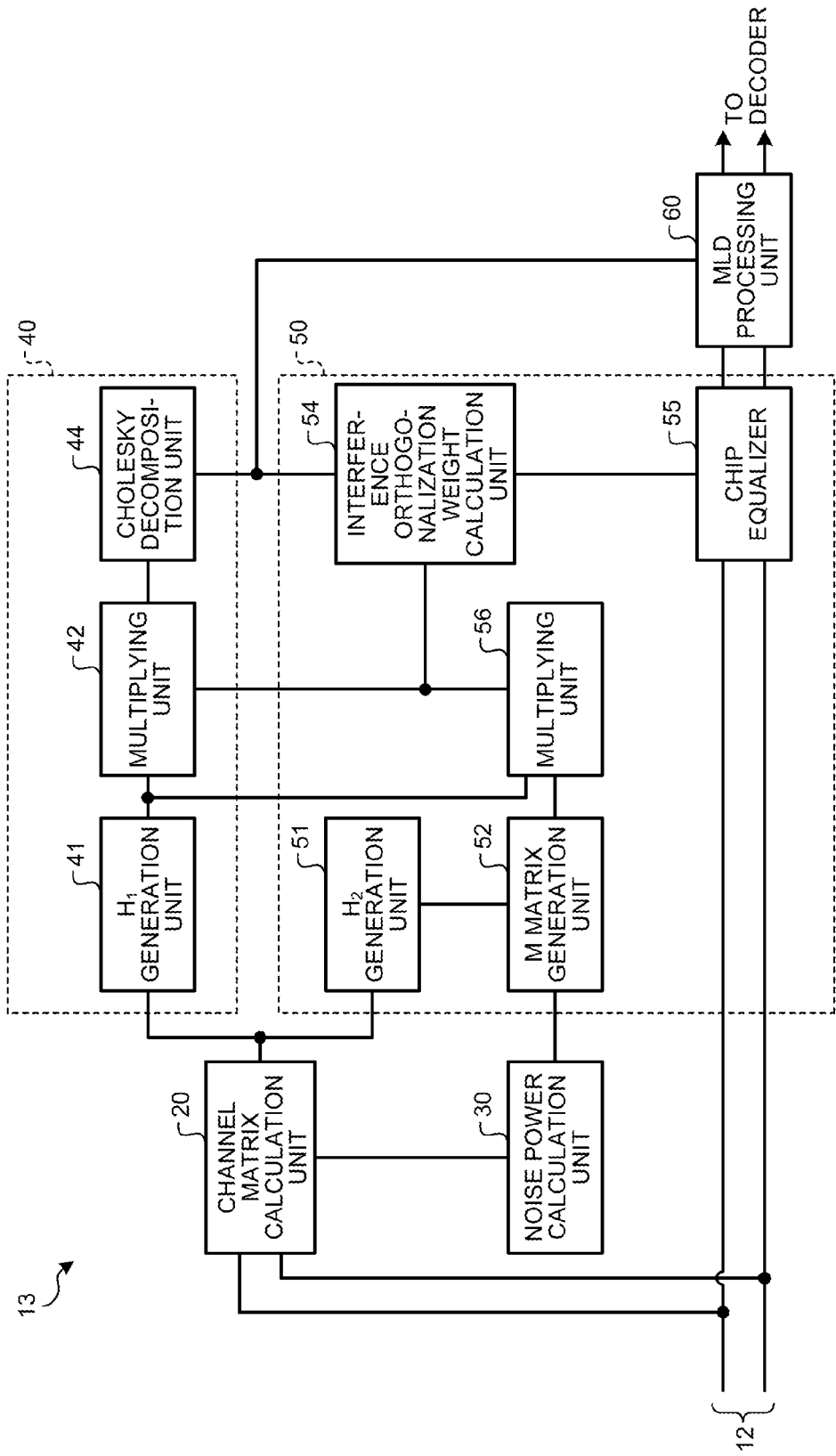
FIG. 5 is a block diagram illustrating an exemplary communication processor according to a third embodiment.

FIG. 5 is a block diagram illustrating an exemplary communication processor 13 according to the third embodiment. The communication processor 13 according to the present embodiment includes the channel matrix calculation unit 20, the noise power calculation unit 30, the MLD channel matrix calculation unit 40, the interference orthogonalization equalizer 50, and the MLD processing unit 60. Other than the following to be explained, the configuration in FIG. 5 having the same signs as in FIG. 4 has the same or similar function as in FIG. 4. Therefore, explanation for this will be omitted.

The MLD channel matrix calculation unit 40 includes the $H_1$ generation unit 41, the multiplying unit 42, and a Cholesky decomposition unit 44. The multiplying unit 42 calculates $H_1^H M^{-1} H_1$ by multiplying a Hermitian transpose $H_1^H$ of the $H_1$ matrix generated by the $H_1$ generation unit 41 and $M^{-1}H_1$ calculated by a multiplying unit 56 to be described later.

The Cholesky decomposition unit 44 performs Cholesky decomposition for $H_1^H M^{-1} H_1$ calculated by the multiplying unit 42, as illustrated in previously described equation (22). The Cholesky decomposition unit 44 outputs the Hermitian transpose $L^H$ of the lower triangular matrix L, calculated by Cholesky decomposition, to the MLD processing unit 60 and to an interference orthogonalization weight calculation unit 54 to be described later.

The interference orthogonalization equalizer 50 includes the $H_2$ generation unit 51, the M matrix generation unit 52, the interference orthogonalization weight calculation unit 54, the chip equalizer 55, and the multiplying unit 56. The multiplying unit 56 calculates $M^{-1}H_1$ by multiplying an inverse matrix $M^{-1}$ of the correlation matrix M calculated by the M matrix generation unit 52 and the $H_1$ matrix generated by the $H_1$ generation unit 41. As illustrated in previously described equation (25), the interference orthogonalization weight calculation unit 54 calculates the interference orthogonalization weight $W_o$ by multiplying an inverse matrix $(L^H)^{-1}$ of the Hermitian transpose $L^H$ of the lower triangular matrix L calculated by the Cholesky decomposition unit 44 and $M^{-1}H_1$ calculated by the multiplying unit 56.

The MLD processing unit 60 performs MLD processing for the reception signal sequence equalized by the chip equalizer 55, by using the Hermitian transpose $L^H$ of the lower triangular matrix L calculated by the Cholesky decomposition unit 44, as the MLD channel matrix $H_{MLD}$.

Effects of Third Embodiment

According to the communication processor 13 of the present embodiment, using the chip equalizer 55 to eliminate multipath influence from the reception signal can suppress the MLD processing volume. According to the communication processor 13 of the present embodiment, decorrelating the interference signal and the noise signal contained in the output of the chip equalizer 55 enables MLD to function efficiently. Furthermore, since QR decomposition is not used in the present embodiment, a frequency equalizer can be used as the chip equalizer 55.

[d] Fourth Embodiment

In the previously described second and third embodiments, the interference orthogonalization weight $W_o$ is calculated, and then, the chip equalizer 55 equalizes the reception signal by using the calculated interference orthogonalization weight $W_o$. In comparison, in the present embodiment, after equalization is performed using a known MMSE equalizer or the like, correction is performed such that the interference signal and the noise signal are orthogonalized in the reception signal after equalization. In this respect, the present embodiment differs from the earlier described second and third embodiments.

Here, it is assumed that the following corresponding relation exists between the interference orthogonalization weight $W_o$ and an ordinary MMSE equalizer weight $W_R$.

$$W_R C = W_O \quad (27)$$

If this is a 2×2 MIMO system, a correction matrix C becomes a 2×2 matrix. The correction matrix C can be obtained by the following equation.

$$C = (W_R^H W_R)^{-1} W_R^H W_O \quad (28)$$

Using the correction matrix C, it is possible to obtain an output result equal to an output result of the interference orthogonalization equalizer by correcting, for example, an MMSE equalizer output. With this, the interference orthogonalization equalizer can be implemented while taking advantage of conventional equalizer resources.

Communication Processor 13

Figure 6:
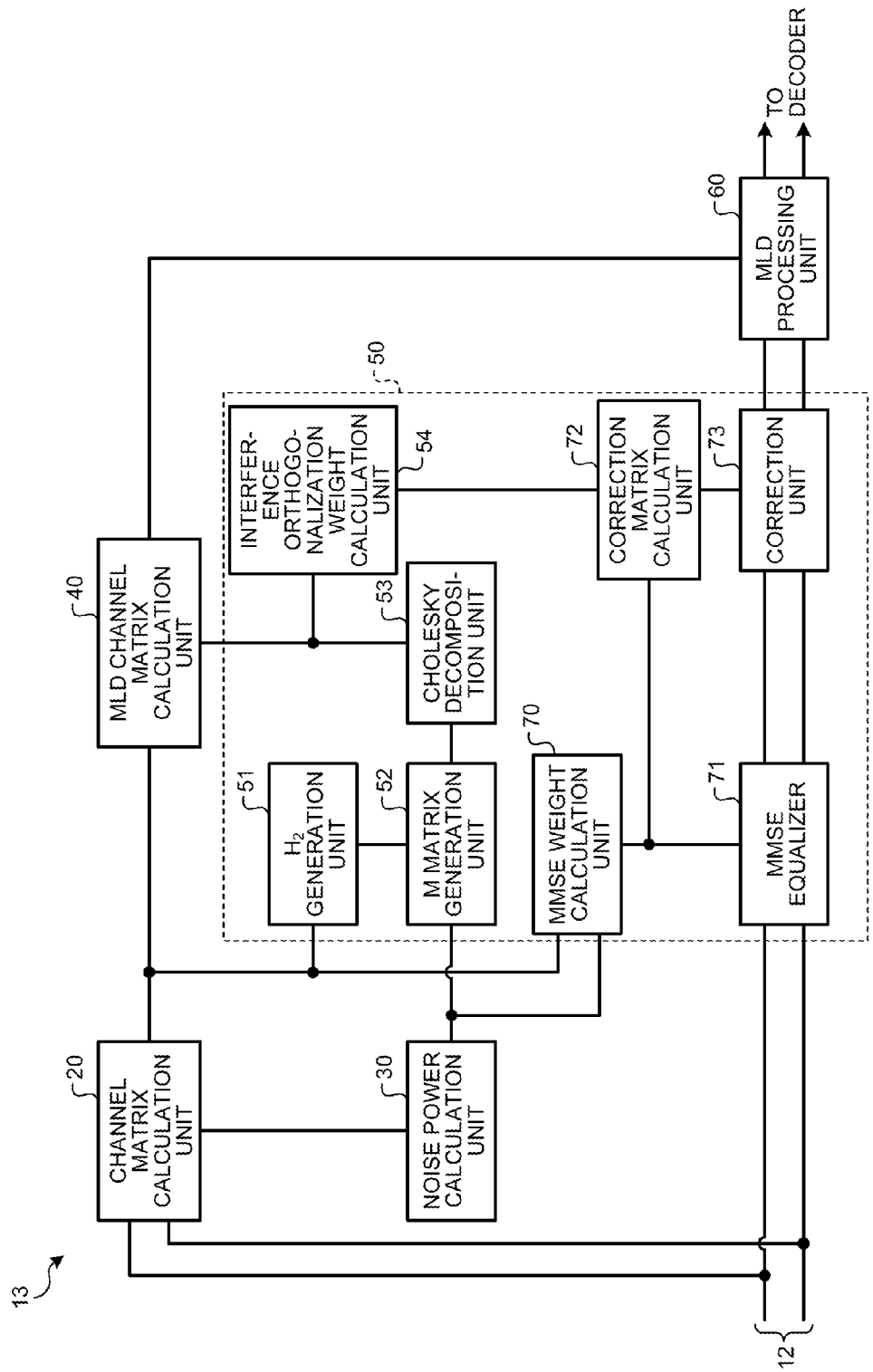
FIG. 6 is a block diagram illustrating an exemplary communication processor according to a fourth embodiment.

FIG. 6 is a block diagram illustrating an exemplary communication processor 13 according to the fourth embodiment. The communication processor 13 according to the present embodiment includes the channel matrix calculation unit 20, the noise power calculation unit 30, the MLD channel matrix calculation unit 40, the interference orthogonalization equalizer 50, and the MLD processing unit 60. Other than the following to be explained, the configuration in FIG. 6 having the same signs as in FIG. 4 has the same or similar function as in FIG. 4. Therefore, explanation for this will be omitted.

The interference orthogonalization equalizer 50 includes the $H_2$ generation unit 51, the M matrix generation unit 52, the Cholesky decomposition unit 53, the interference orthogonalization weight calculation unit 54, an MMSE weight calculation unit 70, an MMSE equalizer 71, a correction matrix calculation unit 72, and a correction unit 73. Using the channel matrix H calculated by the channel matrix calculation unit 20 and the noise power $\sigma^2$ calculated by the noise power calculation unit 30, the MMSE weight calculation unit 70 calculates the MMSE equalizer weight $W_R$. The MMSE equalizer 71 equalizes a reception signal sequence by using the MMSE equalizer weight $W_R$ calculated by the MMSE weight calculation unit 70.

Using the MMSE equalizer weight $W_R$ calculated by the MMSE weight calculation unit 70 and the interference orthogonalization weight $W_o$ calculated by the interference orthogonalization weight calculation unit 54, the correction matrix calculation unit 72 calculates the correction matrix C based on previously described equation (28). The correction unit 73 corrects the reception signal sequence equalized by the MMSE equalizer 71 based on the correction matrix C calculated by the correction matrix calculation unit 72.

The MLD processing unit 60 performs MLD processing for the reception signal sequence corrected by the correction unit 73, by using an upper triangular matrix $R_1$ decomposed by the QR decomposition unit 43 inside the MLD channel matrix calculation unit 40, as the MLD channel matrix $H_{MLD}$.

Effects of Fourth Embodiment

According to the communication processor 13 of the present embodiment, the interference orthogonalization equalizer can be implemented on the receiving apparatus 10 while taking advantage of conventional equalizer resources.

[e] Fifth Embodiment

In the present embodiment, processing is simplified in a process for correcting a reception signal after being equalized by a known MMSE equalizer, or the like. In this respect, the present embodiment differs from the fourth embodiment.

The following equation (29) is obtained by substituting the MMSE equalizer weight $W_R = R^{-1} H_1$ and previously described equation (24) into previously described equation (28).

$$C = (I - W_R^H H_1)^{-1} L^{-H} \quad (29)$$

In equation (29), a product of the MMSE equalizer weight $W_R$ and a matrix $H_1$ that is a channel matrix of a desired signal is represented as $W_R^H H_1$. By replacing $W_R^H H_1$ with a characteristic matrix A, the equation can be rearranged as follows.

$$A = W_R^H H_1 \quad (30)$$

$$H_1^H M^{-1} H_1 = A(I-A)^{-1} = LL^H \quad (31)$$

$$C = (I-A)^{-1} L^{-H} \quad (32)$$

Based on above-described equations (30) to (32), the characteristic matrix A is obtained by multiplying the MMSE equalizer weight $W_R$ of an ordinary MMSE equalizer and the $H_1$ matrix of the desired signal. Cholesky decomposition is performed for $A(I-A)^{-1}$ to obtain a lower triangular matrix L. From the obtained lower triangular matrix L, the correction matrix C is obtained.

Communication Processor 13

Figure 7:
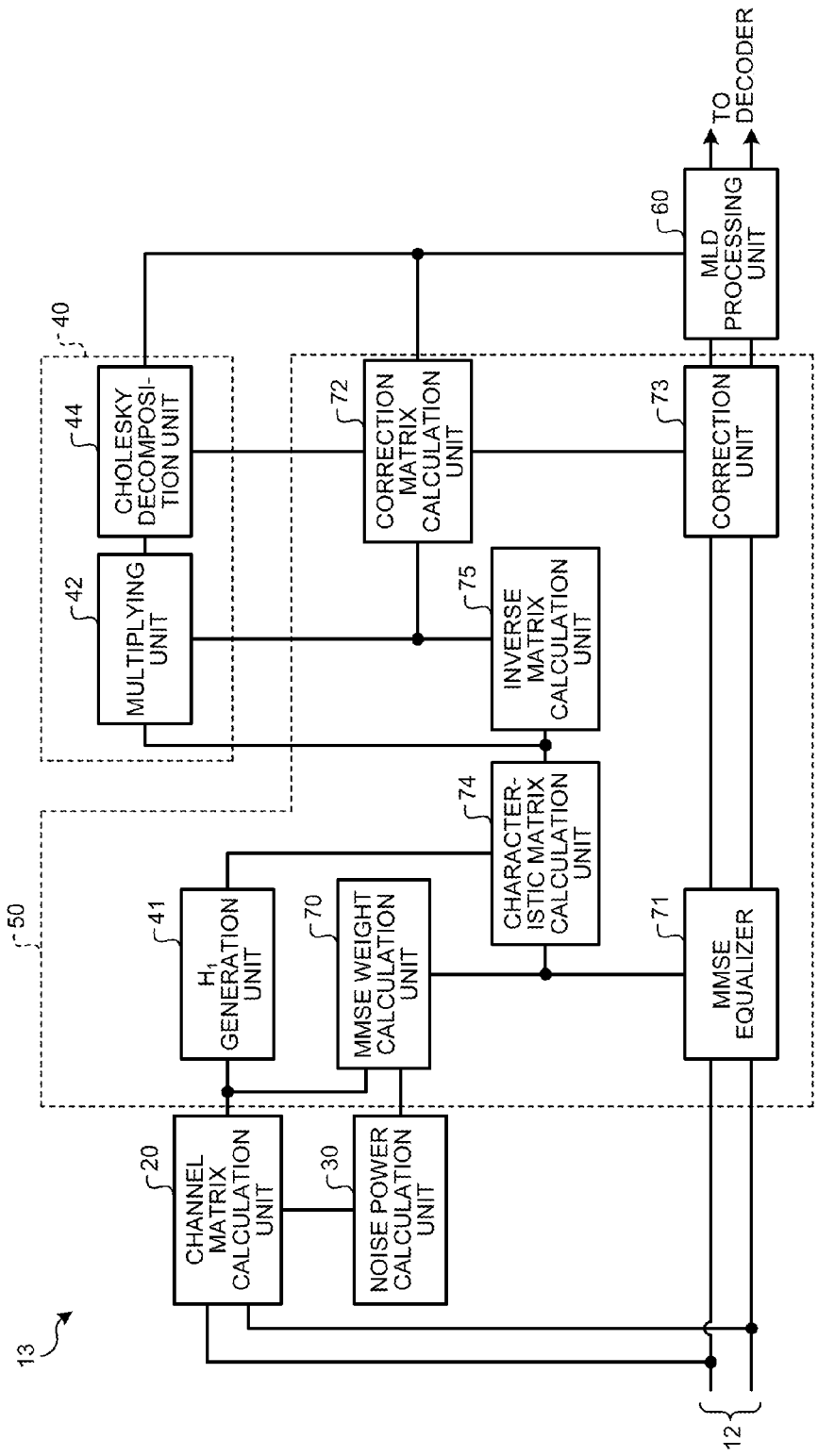
FIG. 7 is a block diagram illustrating an exemplary communication processor according to a fifth embodiment.

FIG. 7 is a block diagram illustrating an exemplary communication processor 13 according to the fifth embodiment. The communication processor 13 according to the present embodiment includes the channel matrix calculation unit 20, the noise power calculation unit 30, the MLD channel matrix calculation unit 40, the interference orthogonalization equalizer 50, and the MLD processing unit 60. Other than the following to be explained, the configuration in FIG. 7 having the same signs as in FIG. 4 or FIG. 6 has the same or similar function as in FIG. 4 or FIG. 6. Therefore, explanation for this will be omitted.

The interference orthogonalization equalizer 50 includes the $H_1$ generation unit 41, the MMSE weight calculation unit 70, the MMSE equalizer 71, the correction matrix calculation unit 72, the correction unit 73, a characteristic matrix calculation unit 74, and an inverse matrix calculation unit 75. The characteristic matrix calculation unit 74 calculates the characteristic matrix A, based on previously described equation (30), by using the $H_1$ matrix generated by the $H_1$ generation unit 41 and the MMSE equalizer weight $W_R$ calculated by the MMSE weight calculation unit 70.

Using the characteristic matrix A calculated by the characteristic matrix calculation unit 74, the inverse matrix calculation unit 75 calculates an inverse matrix $(I-A)^{-1}$ of a matrix that is obtained by subtracting the characteristic matrix A from an identity matrix I. The correction matrix calculation unit 72 calculates the correction matrix C, based on previously described equation (32), by multiplying an inverse matrix $(I-A)^{-1}$ calculated by the inverse matrix calculation unit 75 and an inverse matrix $L^{-H}$ of the Hermitian transpose of the lower triangular matrix L calculated by the Cholesky decomposition unit 44.

The MLD channel matrix calculation unit 40 includes the multiplying unit 42 and the Cholesky decomposition unit 44. The multiplying unit 42 multiplies the characteristic matrix A calculated by the characteristic matrix calculation unit 74 and the inverse matrix $(I-A)^-$ calculated by the inverse matrix calculation unit 75. The Cholesky decomposition unit 44 performs Cholesky decomposition for a product $A(I-A)^{-1}$ of the characteristic matrix A and the inverse matrix $(I-A)^{-1}$, the product having being multiplied by the multiplying unit 42. The Hermitian transpose $L^H$ of the lower triangular matrix L is output to the MLD processing unit 60 and the correction matrix calculation unit 72.

Effects of Fifth Embodiment

On the communication processor 13 of the present embodiment, calculation performed by a block containing the Cholesky decomposition unit 44, the correction matrix calculation unit 72, and the inverse matrix calculation unit 75 may be a 2×2 matrix operation if it is a 2×2 MIMO system. With this, the correction matrix C can be effectively calculated. With this, the interference orthogonalization equalizer can be efficiently implemented on the receiving apparatus 10 while taking advantage of conventional equalizer resources.

[f] Sixth Embodiment

In above-described first to fifth embodiments, MLD is performed for the signal with a timing that corresponds to the desired signal. For example, in a 2×2 MIMO system, the $H_1$ matrix is a matrix with two columns corresponding to two transmission antennas. In the present embodiment, MLD is performed with an additional signal that deviates from the desired signal timing. In this respect, the present embodiment differs from the above-described embodiments. This makes it possible to reduce multipath interference more effectively.

Communication Processor 13

Figure 8:
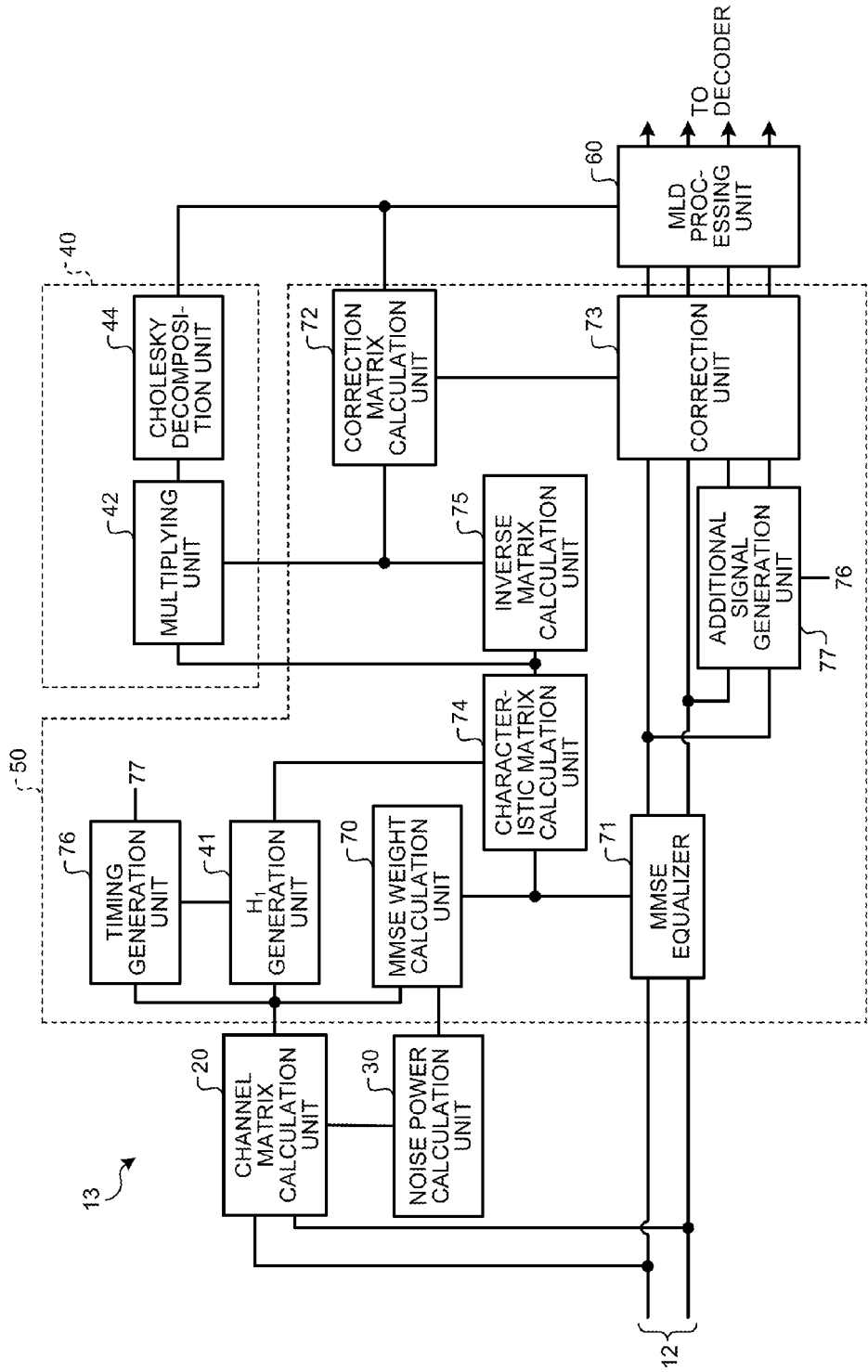
FIG. 8 is a block diagram illustrating an exemplary communication processor according to a sixth embodiment.

FIG. 8 is a block diagram illustrating an exemplary communication processor 13 according to the sixth embodiment. The communication processor 13 according to the present embodiment includes the channel matrix calculation unit 20, the noise power calculation unit 30, the MLD channel matrix calculation unit 40, the interference orthogonalization equalizer 50, and the MLD processing unit 60. Other than the following to be explained, the configuration in FIG. 8 having the same signs as in FIG. 7 has the same or similar function as in FIG. 7. Therefore, explanation for this will be omitted.

The interference orthogonalization equalizer 50 includes the $H_1$ generation unit 41, the MMSE weight calculation unit 70, the MMSE equalizer 71, the correction matrix calculation unit 72, the correction unit 73, the characteristic matrix calculation unit 74, the inverse matrix calculation unit 75, a timing generation unit 76, and an additional signal generation unit 77. The timing generation unit 76 generates, for example, a timing $T_D$ that deviates from the desired signal by a predetermined time. Information on generated timing $T_D$ is output to the $H_1$ generation unit 41 and the additional signal generation unit 77.

The $H_1$ generation unit 41 extracts, from the channel matrix H, a column vector that corresponds to the desired signal, and additionally extracts the column vector that corresponds to the timing that deviates from the desired signal by $T_D$, and adds the extracted vectors to the $H_1$ matrix. The additional signal generation unit 77 additionally generates a signal that has been delayed by the timing $T_D$ with respect to each of the output signals from the MMSE equalizer 71, and then, outputs the generated signal to the correction unit 73.

The correction unit 73 corrects each of the output signals from the MMSE equalizer 71 and from the additional signal generation unit 77 by using the correction matrix C calculated by the correction matrix calculation unit 72. The MLD processing unit 60 performs MLD processing for the signal corrected by the correction unit 73.

In a 2×2 MIMO system, for example, the $H_1$ matrix becomes a 4-column matrix when the number of additional timing $T_D$ is one. When the $H_1$ matrix has four columns, the correction matrix C also becomes a 4×4 matrix. Therefore, in a case where the output signal from the MMSE equalizer 71 is corrected to be used for orthogonalizing the interference signal and the noise signal, for example, an additional signal that has been delayed by the timing $T_D$ with respect to the output signal from the MMSE equalizer 71 is generated. Correction processing is performed for the four signals including the generated signals. The MLD processing unit 60 subsequently performs MLD processing for the four corrected signals. This means MLD processing is performed for part of adjacent signals, making it possible to reduce multipath interference more effectively.

Note that in case of adding a signal other than the desired signal, it is preferable to select a timing that corresponds to a large multipath. For example, the timing generation unit 76 may obtain a peak path timing $t_{p,n}$ from a channel estimation result, and then, may determine the additional timing $T_D$ based on a difference $t_{p,2} - t_{p,1}$, that is the difference between $t_{p,1}$ and $t_{p,2}$, where $t_{p,1}$ representing the largest path timing, $t_{p,2}$ representing the second largest path timing. This makes is possible to reduce multipath interference more effectively.

Effects of Sixth Embodiment

The communication processor 13 according to the present embodiment can reduce multipath interference more effectively.

[g] Seventh Embodiment

The communication processor 13 of the present embodiment is used at a base station, or the like, the base station being provided for demodulating an upstream signal in the long term evolution (LTE; registered trademark) The LTE uses a DFT-S-OFDMA method for the upstream signals. The DFT-S-OFDMA method uses, as specific sub-carriers of orthogonal frequency division multiplexing (OFDM), a signal to which a single-carrier signal has been mapped.

Communication Processor 13

Figure 9:
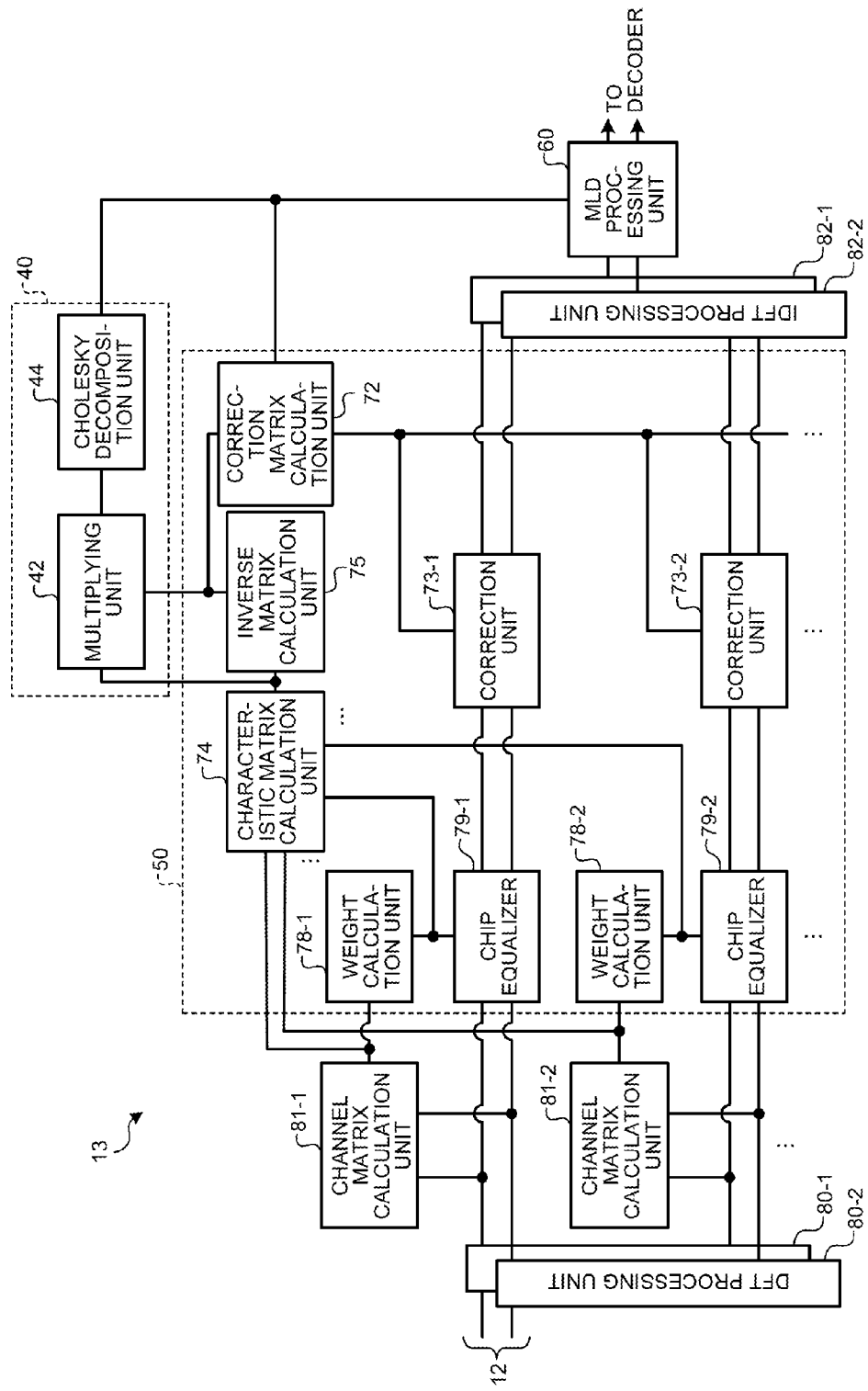
FIG. 9 is a block diagram illustrating an exemplary communication processor according to a seventh embodiment.

FIG. 9 is a block diagram illustrating an exemplary communication processor 13 according to the seventh embodiment. The communication processor 13 according to the present embodiment includes a discrete Fourier transformation (DFT) processing unit 80-1, a DFT processing unit 80-2, a channel matrix calculation unit 81-1, a channel matrix calculation unit 81-2, an inverse discrete Fourier transform (IDFT) processing unit 82-1, and an IDFT processing unit 82-2. The communication processor 13 according to the present embodiment includes the MLD channel matrix calculation unit 40, the interference orthogonalization equalizer 50, and the MLD processing unit 60. Other than the following to be explained, the configuration in FIG. 9 having the same signs as in FIG. 8 has the same or similar function as in FIG. 8. Therefore, explanation for this will be omitted.

Each of the plurality of DFT processing units 80-1 and 80-2 converts each of the plurality of reception signal sequences into a frequency-domain signal by using DFT. Each of the plurality of IDFT processing units 82-1 and 82-2 converts a reception signal sequence into a time-domain signal by using IDFT. In the reception signal sequence, the interference signal and the noise signal are orthogonalized, for each of the sub-carriers, by the interference orthogonalization equalizer 50.

The interference orthogonalization equalizer 50 include: the correction matrix calculation unit 72; a plurality of correction units 73-1 and 73-2; the characteristic matrix calculation unit 74; the inverse matrix calculation unit 75; a plurality of weight calculation units 78-1 and 78-2; and a plurality of chip equalizers 79-1 and 79-2. Each one of the pairs, namely, the channel matrix calculation units 81-1 and 81-2, the weight calculation units 78-1 and 78-2, the chip equalizers 79-1 and 79-2, and the correction units 73-1 and 73-2, is provided for each of the sub-carriers. In the following, processing for one sub-carrier will be described. Hereinafter, each of the correction units 73-1 and 73-2 is generally referred to as correction unit 73 when each of them is not distinguished from one another. Each of the weight calculation units 78-1 and 78-2 is generally referred to as weight calculation unit 78 when each of them is not distinguished from one another. Each of the chip equalizers 79-1 and 79-2 is generally referred to as chip equalizer 79 when each of them is not distinguished from one another. Each of the DFT processing units 80-1 and 80-2 is generally referred to as DFT processing unit 80 when each of them is not distinguished from one another. Each of the channel matrix calculation units 81-1 and 81-2 is generally referred to as channel matrix calculation unit 81 when each of them is not distinguished from one another. Each of the IDFT processing units 82-1 and 82-2 is generally referred to as IDFT processing unit 82 when each of them is not distinguished from one another.

The channel matrix calculation unit 81 calculates a channel matrix H for each of the sub-carriers. Using the channel matrix H, the weight calculation unit 78 calculates the chip equalizer weight w for each of the sub-carriers. The chip equalizer 79 is a known frequency-domain MMSE equalizer, and equalizes, for each of sub-channels, the DFT-processed reception signal sequence by using an equalizer weight w calculated by the weight calculation unit 78.

The DFT-S-OFDMA method uses a signal in which a single-carrier signal has been mapped to a specific sub-carrier. Thus, computation efficiency is high because equalization processing can be performed in a frequency domain. The present embodiment may be applicable to equalization processing in the frequency domain after some modification is added. In the present embodiment, the interference orthogonalization equalizer is implemented by correcting, as illustrated in FIG. 9, the output from the conventional frequency-domain MMSE equalizer.

It is known that the frequency-domain MMSE equalizer may perform equalization computation separately for each of the sub-carriers k. The interference orthogonalization equalizer, however, uses information on all sub-carriers for computation for correction. In this respect, the interference orthogonalization equalizer differs from ordinary frequency-domain MMSE equalizers. In the present embodiment, as illustrated in FIG. 9, for example, the characteristic matrix calculation unit 74 calculates by using channel matrix $\underline{H}_k$ in the frequency domain of all sub-carriers and an MMSE weight matrix $\underline{W}_k$ in the frequency domain as input, a value of a characteristic matrix A based on the following equation. (here, a variable indicating a frequency-domain value is represented by underlining).

$$A = \left(\frac{1}{N_{DFT}}\right) \sum_{k=1}^{N_{DFT}} \underline{W}_k^H \underline{H}_k \qquad (33)$$

Note that in 2×2 MIMO system, each of a channel matrix in the frequency domain and the MMSE weight matrix in the frequency domain for all sub-carriers is a 2×2 matrix.

The correction matrix calculation unit 72 calculates the correction matrix C by using the characteristic matrix A illustrated in above-described equation (33), based on equations (31) and (32) previously described in the fifth embodiment. The correction unit 73 corrects the reception signal sequence by multiplying the correction matrix C and the reception signal sequence, for each of the sub-carriers. Note that although information on all sub-carriers is used to obtain the correction matrix C, correction processing itself is performed by using the identical correction matrix C for all sub-carriers.

Effects of Seventh Embodiment

According to the communication processor 13 of the present embodiment, the interference orthogonalization equalizer performing equalization processing in the frequency domain can be implemented on the receiving apparatus 10 while taking advantage of conventional equalizer resources.

[h] Eighth Embodiment

Correction processing of the reception signal sequence after equalization may be performed after IDFT processing. The present embodiment differs from the seventh embodiment in that correction processing is performed in a time domain.

Communication Processor 13

Figure 10:
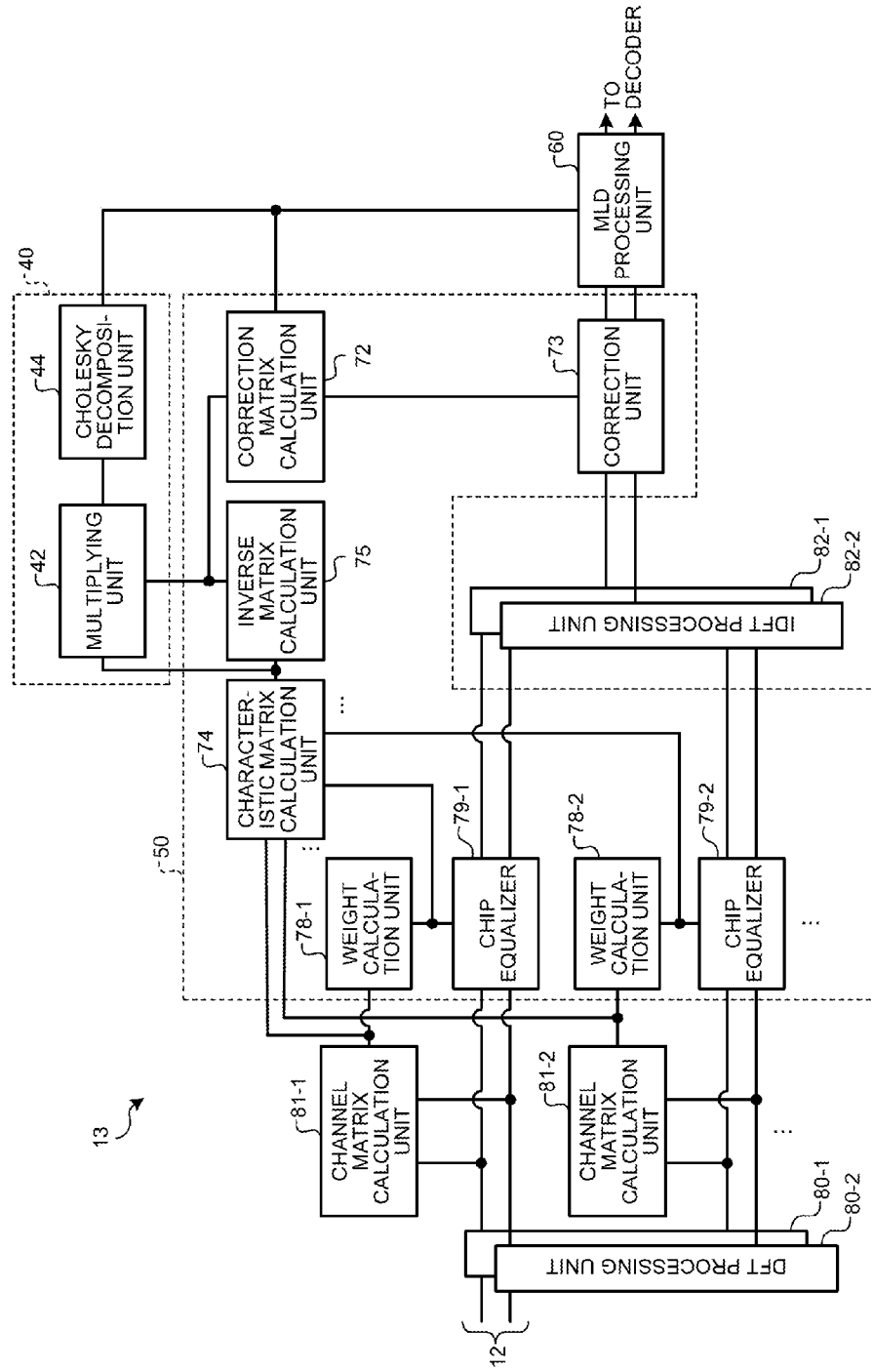
FIG. 10 is a block diagram illustrating an exemplary communication processor according to an eighth embodiment.

FIG. 10 is a block diagram illustrating an exemplary communication processor 13 according to an eighth embodiment. The communication processor 13 according to the present embodiment includes the plurality of DFT processing units 80-1 and 80-2, the plurality of channel matrix calculation units 81-1 and 81-2, the plurality of IDFT processing units 82-1 and 82-2, the MLD channel matrix calculation unit 40, the interference orthogonalization equalizer 50, and MLD processing unit 60. Other than the following to be explained, the configuration in FIG. 10 having the same signs as in FIG. 9 has the same or similar function as in FIG. 9. Therefore, explanation for this will be omitted.

The interference orthogonalization equalizer 50 includes the correction matrix calculation unit 72, the correction unit 73, the characteristic matrix calculation unit 74, the inverse matrix calculation unit 75, the plurality of weight calculation units 78-1 and 78-2, and the plurality of the chip equalizers 79-1 and 79-2. Each one of the pairs, namely, the channel matrix calculation units 81-1 and 81-2; the weight calculation units 78-1 and 78-2; and the chip equalizers 79-1 and 79-2 is provided for each of the sub-carriers.

Using the correction matrix C calculated by the correction matrix calculation unit 72, the correction unit 73 corrects the reception signal sequence converted into a time-domain signal by each of the plurality of IDFT processing units 82-1 and 82-2. With this, frequency-domain calculation for a frequency-domain MMSE equalizer is not modified, making it possible to achieve easy use of conventional resources and easy implementation. In the present embodiment, the correction matrix C is obtained by a frequency-domain channel estimation value, or the like. In this respect, the present embodiment differs from the fourth and fifth embodiments. This makes it unnecessary to perform IDFT processing on the frequency-domain channel estimation value. Thus efficient implementation is possible when implementation is performed based on the frequency-domain MMSE equalizer.

Effects of Eighth Embodiment

According to the communication processor 13 of the present embodiment, the interference orthogonalization equalizer performing equalization processing in the frequency domain can be implemented on the receiving apparatus 10 while taking advantage of conventional equalizer resources.

Hardware

Individual components in the figures described herein need not be configured in the same physical conditions as illustrated in the figures. In other words, specific forms of dispersion or integration of each unit are not limited to ones in the figures. All or part of them may be configured in a functionally or physically dispersed or integrated form in an arbitrary unit, according to various loads and status of use, or the like.

Furthermore, various processing functions on individual apparatuses may be arranged such that all or part of them can be performed on CPU, or other microcomputers such as a micro processing unit (MPU) and a micro controller unit (MCU). In addition, various processing functions may be understandably arranged such that all or part of them can be performed on a program analyzed and run on CPU (or on other microcomputers such as MPU and MCU), or on hardware using a wired logic circuit.

Figure 11:
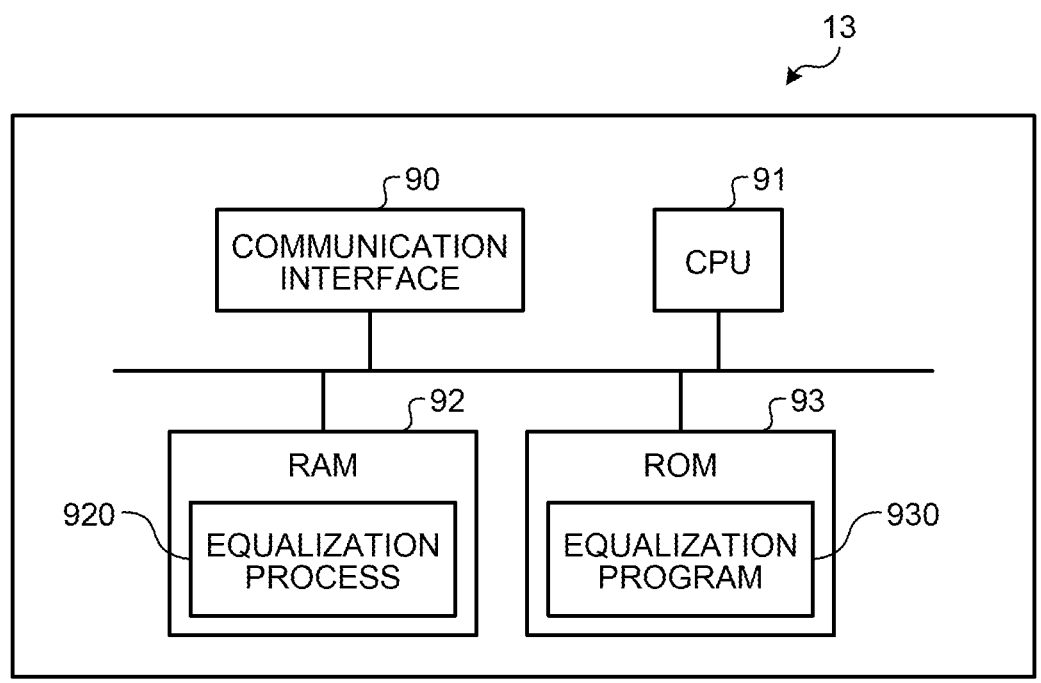
FIG. 11 is a diagram illustrating exemplary hardware for a communication processor.

Meanwhile, various processing described in the present embodiments may be implemented by executing a prepared program on a computer. Thus, the following will describe an exemplary computer for executing a program having similar function as in the above-described embodiments. FIG. 11 is a diagram illustrating exemplary hardware for the communication processor 13.

In FIG. 11, the communication processor 13 for executing a demodulation processing program includes a communication interface 90, a CPU 91, a RAM 92, and a ROM 93.

In the ROM 93, an equalization program 930 is stored in advance as illustrated in FIG. 11. The CPU 91 reads the equalization program 930 from the ROM 93 and expands the program into the RAM 92. The equalization program 930 may be integrated or separated in a similar manner as various components illustrated in FIG. 2 and FIGS. 4 to 10. As for data to be stored in ROM 93, not all data is always stored in ROM 93. The data to be used for the processing may be stored in ROM 93.

The CPU 91 enables the equalization program 930 to function as an equalization process 920. The equalization process 920 expands various data read from the ROM 93 onto an allocated region on the RAM 92, and then, performs various processing based on the expanded various data.

In the above-described first to sixth embodiments, the CPU 91 achieves functions similar to the functions performed by the channel matrix calculation unit 20, the noise power calculation unit 30, the MLD channel matrix calculation unit 40, the interference orthogonalization equalizer 50, and the MLD processing unit 60. Furthermore, in the above-described seventh and eighth embodiments, the CPU 91 achieves similar functions as those performed by the MLD channel matrix calculation unit 40, the interference orthogonalization equalizer 50, the MLD processing unit 60, the DFT processing unit 80, the channel matrix calculation unit 81, and the IDFT processing unit 82.

Furthermore, the equalization process 920 in the above-described first embodiment performs processing illustrated in FIG. 3, for example. The processing illustrated in FIG. 3 is performed by the units illustrated in FIG. 2 including the channel matrix calculation unit 20, the noise power calculation unit 30, the MLD channel matrix calculation unit 40, the interference orthogonalization equalizer 50, and the MLD processing unit 60. Regarding each of the processing units virtually implemented by the CPU 91, not all of the processing units are constantly implemented by the CPU 91. Only the processing units used for a process may be virtually implemented.

The equalization process 920 need not be initially stored in ROM 93. For example, each of the programs may be stored in a transportable storage medium such as an IC card to be inserted into the receiving apparatus 10. Subsequently, the communication processor 13 may obtain each of the programs from the above-mentioned transportable storage medium and execute the program. Alternatively, the communication processor 13 may obtain each of the programs from another computer or server apparatus or the like on which each of the programs are stored, via a radio communication network, a public network, Internet, LAN or WAN, and then, execute the program.

According to an aspect of an embodiment, the computation volume for demodulation processing can be reduced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A receiving apparatus comprising:
a channel matrix calculation unit that calculates a channel matrix of a propagation path based on a reception signal;
a noise power calculation unit that calculates a noise power included in the reception signal;

an interference orthogonalization equalizer that orthogonalizes an interference signal by equalizing the reception signal by using the channel matrix and the noise power;
a maximum likelihood detection (MLD) channel matrix calculation unit that calculates an MLD channel matrix including a characteristic of the interference orthogonalization equalizer; and
an MLD processing unit that performs MLD processing of the reception signal in which the interference signal has been orthogonalized by the interference orthogonalization equalizer, by using the MLD channel matrix.

2. The receiving apparatus according to claim 1, wherein the MLD channel matrix calculation unit comprises:
a first matrix generation unit that generates a first matrix formed with a column vector that is included in the channel matrix and corresponds to a timing of a desired signal;
a multiplying unit that multiplies an inverse matrix of a lower triangular matrix, and the first matrix, the lower triangular matrix calculated by the interference orthogonalization equalizer; and
a QR decomposition unit that performs QR decomposition for a product of the inverse matrix of the lower triangular matrix, and the first matrix, to decompose the product into an orthogonal matrix and an upper triangular matrix,
wherein the interference orthogonalization equalizer comprises:
a second matrix generation unit that generates a second matrix formed with the column vector that is included in the channel matrix and corresponds to the timing other than the timing of the desired signal;
a correlation matrix generation unit that generates a correlation matrix by using the noise power and the second matrix;
a Cholesky decomposition unit that generates the lower triangular matrix and a Hermitian transpose of the lower triangular matrix by performing Cholesky decomposition for the correlation matrix;
an interference orthogonalization weight calculation unit that calculates an interference orthogonalization weight by using the inverse matrix of the Hermitian transpose of the lower triangular matrix and by using the orthogonal matrix; and
an equalizer that equalizes the reception signal based on the interference orthogonalization weight,
wherein the MLD processing unit performs the MLD processing for the reception signal equalized by the equalizer, by using the upper triangular matrix.

3. The receiving apparatus according to claim 1, wherein the MLD channel matrix calculation unit includes:
a first matrix generation unit that generates a first matrix formed with a column vector that is included in the channel matrix and corresponds to a timing of a desired signal;
a first multiplying unit that multiplies a product of an inverse matrix of a correlation matrix and the first matrix, and a Hermitian transpose of the first matrix, the inverse matrix of the correlation matrix calculated by the interference orthogonalization equalizer;
a Cholesky decomposition unit that performs Cholesky decomposition for a product of the inverse matrix of the correlation matrix, the first matrix, and the Hermitian transpose of the first matrix, wherein the interference orthogonalization equalizer includes:
a second matrix generation unit that generates a second matrix formed with the column vector that is included in the channel matrix and corresponds to the timing other than the timing of the desired signal;
a correlation matrix generation unit that generates the correlation matrix using the noise power and the second matrix;
a second multiplying unit that multiplies the inverse matrix of the correlation matrix, and the first matrix;
an interference orthogonalization weight calculation unit that calculates an interference orthogonalization weight by multiplying the product of the inverse matrix of the correlation matrix and the first matrix, and the inverse matrix of the Hermitian transpose of a lower triangular matrix decomposed by the Cholesky decomposition unit; and
an equalizer that equalizes the reception signal based on the interference orthogonalization weight,
wherein the MLD processing unit performs MLD processing for the reception signal equalized by the equalizer, by using the Hermitian transpose of the lower triangular matrix decomposed by the Cholesky decomposition unit.

4. The receiving apparatus according to claim 1, wherein the interference orthogonalization equalizer comprises:
an interference orthogonalization weight calculation unit that calculates an interference orthogonalization weight based on the channel matrix and the noise power;
an MMSE weight calculation unit that calculates an MMSE weight based on the channel matrix and the noise power;
an MMSE equalizer that equalizes the reception signal based on the MMSE weight;
a correction matrix calculation unit that calculates a correction matrix based on the interference orthogonalization weight and the MMSE weight; and
a correction unit that corrects the reception signal equalized by the MMSE equalizer, based on the correction matrix,
wherein the MLD processing unit performs MLD processing for the reception signal corrected by the correction unit, by using the MLD channel matrix.

5. The receiving apparatus according to claim 1, wherein the interference orthogonalization equalizer comprise:
a first matrix generation unit that generates a first matrix formed with a column vector that is included in the channel matrix and corresponds to a timing of a desired signal;
an MMSE weight calculation unit that calculates an MMSE weight based on the channel matrix and the noise power;
an MMSE equalizer that equalizes the reception signal based on the MMSE weight;
a characteristic matrix calculation unit that calculates a characteristic matrix by multiplying a Hermitian transpose of the MMSE weight, and the first matrix;
an inverse matrix calculation unit that calculates an inverse matrix of a matrix obtained by subtracting the characteristic matrix from an identity matrix;
a correction matrix calculation unit that calculates a correction matrix by multiplying an inverse matrix of a Hermitian transpose of a lower triangular matrix, calculated by the MLD channel matrix calculation unit, and the inverse matrix of the matrix obtained by subtracting the characteristic matrix from the identity matrix; and a correction unit that corrects the reception signal equalized by the MMSE equalizer, based on the correction matrix;

wherein the MLD channel matrix calculation unit comprises:

a multiplying unit that multiplies the characteristic matrix and the inverse matrix of the matrix obtained by subtracting the characteristic matrix from the identity matrix; and a Cholesky decomposition unit that performs Cholesky decomposition for a product of the characteristic matrix and the inverse matrix of the matrix obtained by subtracting characteristic matrix from the identity matrix, wherein the MLD processing unit performs MLD processing for the reception signal corrected by the correction unit, by using the Hermitian transpose of the lower triangular matrix decomposed by the Cholesky decomposition unit.

6. The receiving apparatus according to claim 5, wherein the interference orthogonalization equalizer further comprise:

a timing generation unit that generates a timing that deviates by a predetermined time from a desired signal;

an additional signal generation unit that generates an additional signal in which output of the MMSE equalizer has been delayed for the predetermined time;

wherein the first matrix generation unit further includes, in the first matrix, a column vector that corresponds to the timing generated by the timing generation unit, the correction unit, based on the correction matrix, corrects the reception signal equalized by the MMSE equalizer and the additional signal generated by the additional signal generation unit, and the MLD processing unit performs MLD processing for the reception signal and the additional signal, the both signals corrected by the correction unit, by using the Hermitian transpose of the lower triangular matrix decomposed by the Cholesky decomposition unit.

7. The receiving apparatus according to claim 6, wherein the timing generation unit generates an additional timing based on a peak path timing as a result of channel estimation of the propagation path.

8. The receiving apparatus according to claim 1, comprising:

a first conversion unit that converts the reception signal into a frequency component;

a second conversion unit that converts the reception signal equalized by the interference orthogonalization equalizer into a time-domain signal for each of sub-channels of the reception signal converted into the frequency component by the first conversion unit;

wherein the channel matrix calculation unit calculates the channel matrix for each of the sub-channels, the interference orthogonalization equalizer comprises:

a weight calculation unit that calculates an equalizer weight for each of the sub-channels based on the channel matrix;

an equalizer that equalizes the reception signal for each of the sub-channels by using the equalizer weight;

a correction unit that corrects the reception signal equalized by the equalizer, for each of the sub-channels, by using a correction matrix;

a characteristic matrix calculation unit that calculates a characteristic matrix based on the channel matrix and on the equalizer weight for each of the sub-channels;

an inverse matrix calculation unit that calculates an inverse matrix of a matrix obtained by subtracting the characteristic matrix from an identity matrix; and a correction matrix calculation unit that calculates the correction matrix by multiplying an inverse matrix of a Hermitian transpose of a lower triangular matrix calculated by the MLD channel matrix calculation unit, and the inverse matrix of the matrix obtained by subtracting the characteristic matrix from the identity matrix, wherein the MLD channel matrix calculation unit comprises:

a multiplying unit that multiplies the characteristic matrix and the inverse matrix of the matrix obtained by subtracting the characteristic matrix from the identity matrix; and a Cholesky decomposition unit that performs Cholesky decomposition for a product of the characteristic matrix and the inverse matrix of the matrix obtained by subtracting the characteristic matrix from the identity matrix, wherein the MLD processing unit performs MLD processing for the reception signal converted into a time-domain signal by the second conversion unit, by using the Hermitian transpose of the lower triangular matrix decomposed by the Cholesky decomposition unit.

9. The receiving apparatus according to claim 1, wherein the channel matrix calculation unit calculates the channel matrix for each of sub-channels, the reception apparatus comprises:

a first conversion unit that converts the reception signal to a frequency component for each of sub-channels;

a weight calculation unit that calculates an equalizer weight based on the channel matrix, for each of the sub-channels of the reception signal converted into the frequency component by the first conversion unit;

an equalizer that equalizes the reception signal for each of the sub-channels by using the equalizer weight;

a second conversion unit that converts the reception signal equalized for each of the sub-channels by the equalizer, into a time-domain signal, wherein the interference orthogonalization equalizer comprises:

a characteristic matrix calculation unit that calculates a characteristic matrix based on the channel matrix and on the equalizer weight for each of the sub-channels, an inverse matrix calculation unit that calculates an inverse matrix of a matrix obtained by subtracting the characteristic matrix from an identity matrix;

a correction matrix calculation unit that calculates a correction matrix by multiplying an inverse matrix of a Hermitian transpose of a lower triangular matrix, calculated by the MLD channel matrix calculation unit, and the inverse matrix of the matrix obtained by subtracting the characteristic matrix from the identity matrix, and a correction unit that corrects the reception signal converted into a time-domain by the second conversion unit, by using the correction matrix, wherein the MLD channel matrix calculation unit comprises:

a multiplying unit that multiplies the characteristic matrix and the inverse matrix of the matrix obtained by subtracting the characteristic matrix from the identity matrix; and a Cholesky decomposition unit that performs Cholesky decomposition for a product of the characteristic matrix and the inverse matrix of the matrix obtained by subtracting the characteristic matrix from the identity matrix, wherein the MLD processing unit performs MLD processing for the reception signal corrected by the correction unit, by using the Hermitian transpose of the lower triangular matrix decomposed by the Cholesky decomposition unit.

10. An equalization processing method comprising:

calculating, by a processor, a channel matrix of a propagation path based on a reception signal;

calculating, by the processor, a noise power included in the reception signal;

orthogonalizing, by the processor, an interference signal by using the channel matrix and the noise power to equalize the reception signal;

calculating, by the processor, an MLD channel matrix including a characteristic of an interference orthogonalization equalizer; and performing, by the processor, MLD processing of the reception signal in which the interference signal has been orthogonalized by the interference orthogonalization equalizer, by using the MLD channel matrix.

* * * * *